US008656902B2

(12) United States Patent
Wei et al.

(10) Patent No.: US 8,656,902 B2
(45) Date of Patent: Feb. 25, 2014

(54) TABLE SAW HAVING A DETACHABLE TABLE EXTENSION FOR CUTTING TILE

(75) Inventors: Hongge Wei, Nanjing (CN); Yu Zhang, Nanjing (CN); Haiyu Ji, Nanjing (CN); Yundong Chen, Nanjing (CN)

(73) Assignee: Chervon Limited, Wanchai (HK)

( * ) Notice: Subject to any disclaimer, the term of this patent is extended or adjusted under 35 U.S.C. 154(b) by 350 days.

(21) Appl. No.: 12/780,121

(22) Filed: May 14, 2010

(65) Prior Publication Data

US 2010/0288257 A1 Nov. 18, 2010

(30) Foreign Application Priority Data

May 14, 2009 (CN) ...................... 2009 2 0045296 U

(51) Int. Cl.
*B28D 7/04* (2006.01)
*B28D 1/04* (2006.01)

(52) U.S. Cl.
USPC .......... 125/35; 125/12; 125/13.01; 83/435.11

(58) Field of Classification Search
USPC ............ 125/13.01, 13.03, 35, 12; 108/26, 29, 108/30; 451/360; 83/471, 435.11
See application file for complete search history.

(56) References Cited

U.S. PATENT DOCUMENTS 1,082,443 A * 12/1913 Possons ........................ 126/332
3,267,887 A * 8/1966 Boyd ............................ 108/152
3,672,624 A * 6/1972 Keller ........................... 248/243
3,714,906 A * 2/1973 Finestone ....................... 108/64
4,026,508 A * 5/1977 Ziegler ..................... 248/220.22
4,677,920 A * 7/1987 Eccardt ........................... 108/69
5,676,124 A 10/1997 Lee
6,080,041 A 6/2000 Greenland
6,272,961 B1 * 8/2001 Lee ................................ 83/581
6,276,990 B1 8/2001 Greenland
6,505,749 B1 * 1/2003 Panetta et al. ............. 211/86.01
6,508,244 B2 * 1/2003 Lee ................................ 125/12
6,637,424 B1 10/2003 Fuhrman et al.
6,672,188 B2 * 1/2004 Lee ................................ 83/168
6,845,768 B2 1/2005 O'Banion et al.
6,883,511 B1 * 4/2005 Tsao .......................... 125/13.03
6,932,073 B2 * 8/2005 Zhang ........................ 125/13.01
6,932,075 B1 * 8/2005 Tsao .......................... 125/13.01
7,086,434 B2 * 8/2006 Lee ........................... 144/286.1
7,308,844 B2 * 12/2007 Sheddy et al. ............. 83/435.11
7,406,962 B1 * 8/2008 Chen ......................... 125/13.01
7,455,003 B2 * 11/2008 Sheddy et al. ............. 83/435.11
7,552,725 B2 * 6/2009 Chen et al. ................. 125/13.01
7,926,477 B2 * 4/2011 Li ............................. 125/13.01
2007/0272066 A1 * 11/2007 Phillips et al. ............ 83/435.11

* cited by examiner

*Primary Examiner* — Lee D Wilson
*Assistant Examiner* — Joel Crandall
(74) *Attorney, Agent, or Firm* — McDermott Will & Emery LLP

(57) ABSTRACT

A tile saw comprises a frame, a primary table moveably supported by the frame for supporting a work-piece to be cut, a water tray located under the primary table, a supporting arm mounted on the frame, and a cutting device supported by the supporting arm. The primary table also includes first and second connecting edges and a secondary table which may be removably attached, without the use of tools, to either the first or second connecting edge of the primary table. When the secondary table is attached, the supporting area for the work-piece is increased resulting in increased stability and increased cutting accuracy.

6 Claims, 3 Drawing Sheets

17 16 19 18 11 132 41 12 15 131 141 14 21 20 22 142 10

10 17 16 19 18 11 15 131 143' 143' 141 14 132 12 143 41 143 142

TABLE SAW HAVING A DETACHABLE TABLE EXTENSION FOR CUTTING TILE

CROSS-REFERENCE TO RELATED APPLICATIONS

This application claims priority under 35 U.S.C. §119 to CN 200920045296.3 filed May 14, 2009, which is hereby incorporated by reference.

FEDERALLY SPONSORED RESEARCH OR DEVELOPMENT

Not Applicable.

TECHNICAL FIELD

The invention relates to a table saw. More specifically, it relates to a table saw designed for cutting masonries and ceramic tiles.

BACKGROUND OF THE INVENTION

A tile saw is widely used for cutting materials such as masonries and ceramic tiles. Typically, a tile saw contains a power head assembly, a table, a base for supporting the table and a water tray located under the base. Usually, the table may be moveable on the base. To perform the cutting operation, a work-piece to be cut is placed on the table, and the table is moved towards the power head assembly in the cutting direction. However, when a work-piece is too large to be cut, placing a large work-piece on the smaller table may be unstable. This can cause an inaccurate or incorrect cutting of the work-piece, which results in inefficiency and wasted materials. In the prior art, a second table is disclosed that may be mounted to the sides of the movable table using fasteners like screws to increase the size and supporting area of the moveable table. However, the addition of the second table increases the dimensions of the entire tile saw unit and thereby increases the delivery costs of the tile saw. Additionally, in the prior art, the mounting and removing of the second table is inconvenient and time consuming due to the use of traditional fasteners like screws and bolts. The use of these types of fasteners prevents the user from being able to quickly and conveniently mount or remove the second table during the cutting operation of the tile saw.

SUMMARY OF THE INVENTION

The object of the invention is to provide a tile saw with a secondary table than can be removably mounted to different portions of the primary table as desired.

Specifically, the tile saw according to the invention has a frame, a primary table moveably supported by the frame for supporting a work-piece to be cut, a water tray located under the primary table, a supporting arm mounted to the frame, and a cutting device supported by the supporting arm. The primary table has a first connecting edge and a second connecting edge. The tile saw also has a secondary table which can be removeably attached to either the first or second connecting edge of the primary table without requiring the use of tools.

As a result, by using the removable secondary table, the tile saw of the present invention can increase the supporting area for work-pieces and improve the stability and cutting accuracy of the saw. Further, although the primary table and secondary table are securely fixed together, they are not fixed together by fasteners that require tools. This allows a user to connect or detach the secondary table at any time based on an immediate need and allows the user to mount the secondary table to multiple portions of the primary table. Moreover, by using the disclosed removable secondary table, the delivery costs and storage space required for the tile saw are effectively reduced.

BRIEF DESCRIPTION OF THE DRAWINGS

This invention will be further described in detail in combination of the following accompanying drawings and embodiments.

DETAILED DESCRIPTION

Figure 1:
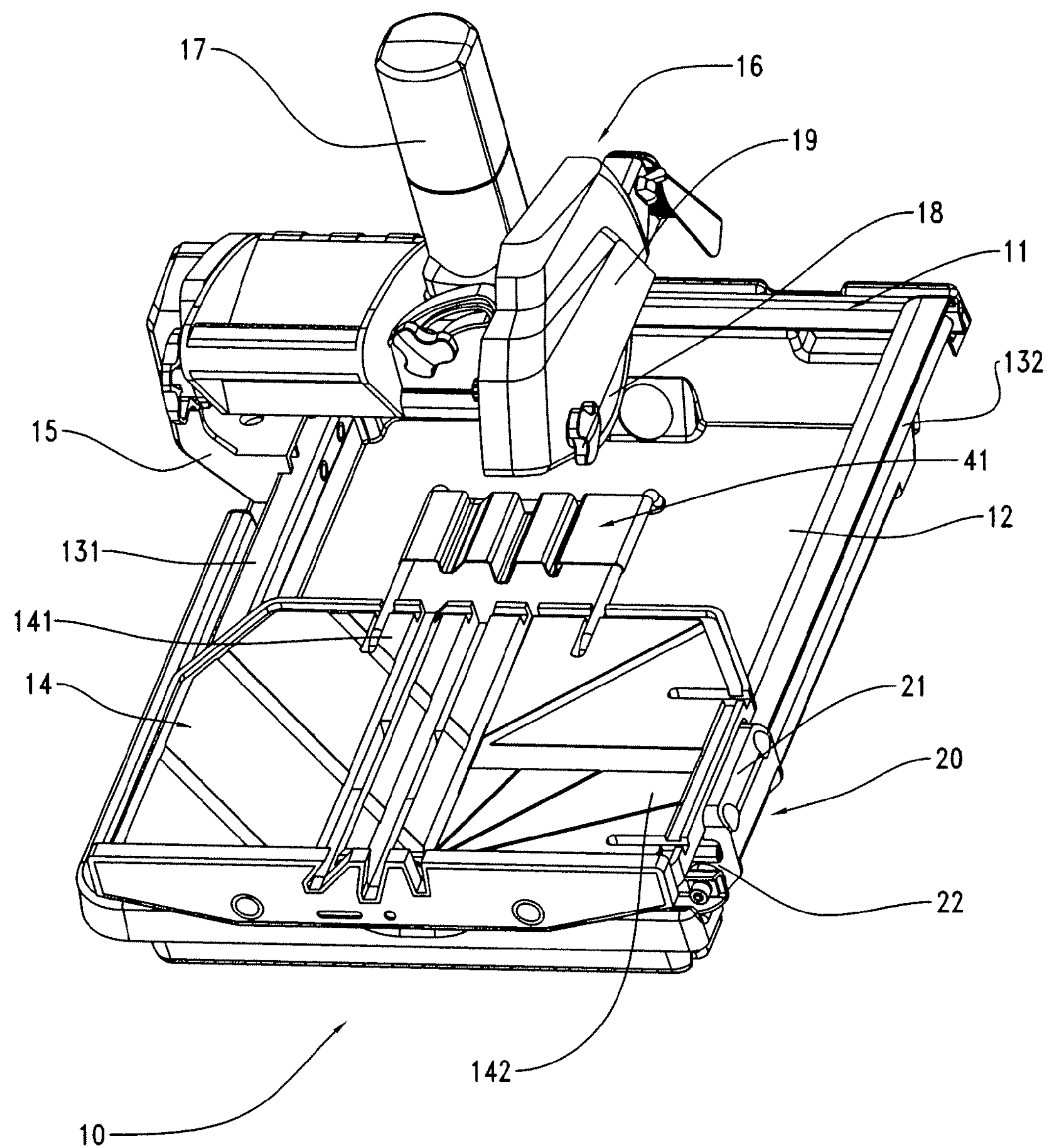
FIG. 1 is a perspective view of a tile saw according to a preferred embodiment of the present invention, wherein a secondary table is mounted on one edge of a primary table in a direction parallel to the guide rails.

FIG. 1 shows a tile saw 10 according to a preferred embodiment of the present invention, which comprises a frame 11, a water tray 12, a table 14, a supporting arm 15 and a cutting device 16. The water tray 12 is located under the table 14 and functions to support the frame 11. The table 14 used to support a work-piece to be cut is located on the frame 11 and supported thereby. In other embodiments, the water tray may be located under the table and supported by the frame. The water tray may also be removable to allow for cleaning. In the present invention, the frame 11 is mounted to a first guide rail 131 and a second guide rail 132, which are parallel to each other and arranged on two sides of the frame 11. The table 14 is slideably mounted on the guide rails. The supporting arm 15 is fixed on the first guide rail 131 for supporting the cutting device 16. Preferably, the cutting device 16 includes a motor 17, a saw blade 18 and a guard 19, wherein the saw blade 18 is driven by the motor 17. The orientation of the saw blade 18 is parallel to the sliding direction of the table 14 on the guide rails. Some connecting assemblies for the relative movement between the table and the frame have been disclosed in the U.S. Pat. Nos. 6,845,768, 6,637,424, 6,080,041, 6,276,990, 5,676,124, which are fully incorporated herein.

The table 14 is connected to the first guide rail 131 on one side by roller 30 located on a bottom surface of the table (seen in FIG. 3) and connected to the second guide rail 132 by a connecting device 20. The connecting device 20 includes a connecting edge 21 connected to the table 14 and a sleeve 22 mounted to the second guide rail 132. The table 14 and the connecting edge 21 of the connecting device 20 are fixedly connected together by fasteners, like screws, to allow the table 14 to be slideably connected to the second guide rail 132.

Figure 2:
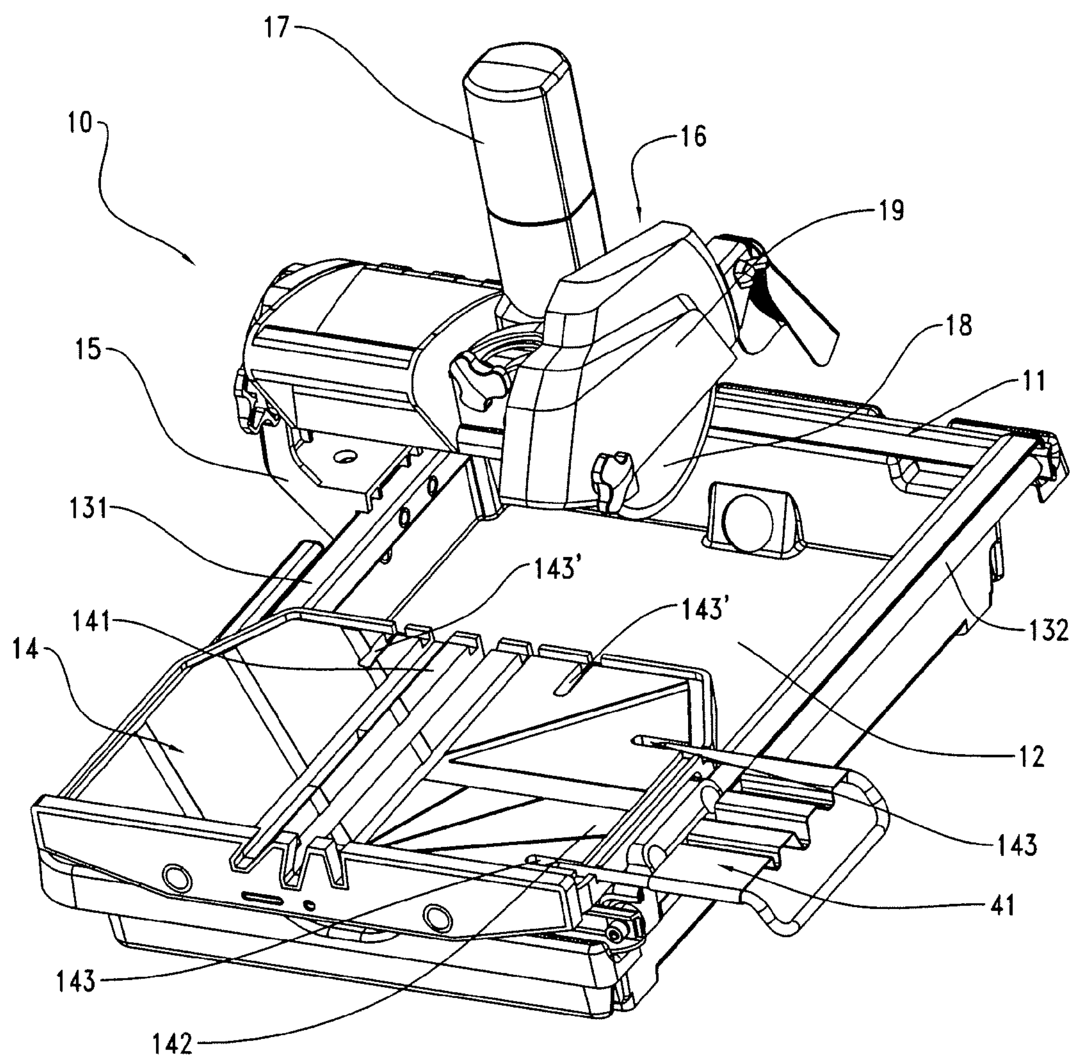
FIG. 2 is a perspective view of the tile saw shown in FIG. 1, wherein the secondary table is mounted on another edge of the primary table in a direction perpendicular to the guide rails.

The tile saw also includes a secondary table 41 which can be selectively mounted to different positions of the table 14. As shown in FIG. 1, the secondary table 41 is mounted to a first edge 141 of the table 14 in a direction parallel to the rails. In FIG. 2, the secondary table 41 is mounted to a second edge 142 of the table 14 in a direction perpendicular to the rails, wherein the second edge 142 is perpendicular to the first edge 141. As is easily understood by a person of ordinary skill, the mounting positions of the secondary table aren't limited to the directions parallel or perpendicular to the rails. Accordingly, the secondary table may be mounted to table 14 at multiple suitable positions.

Figure 3:
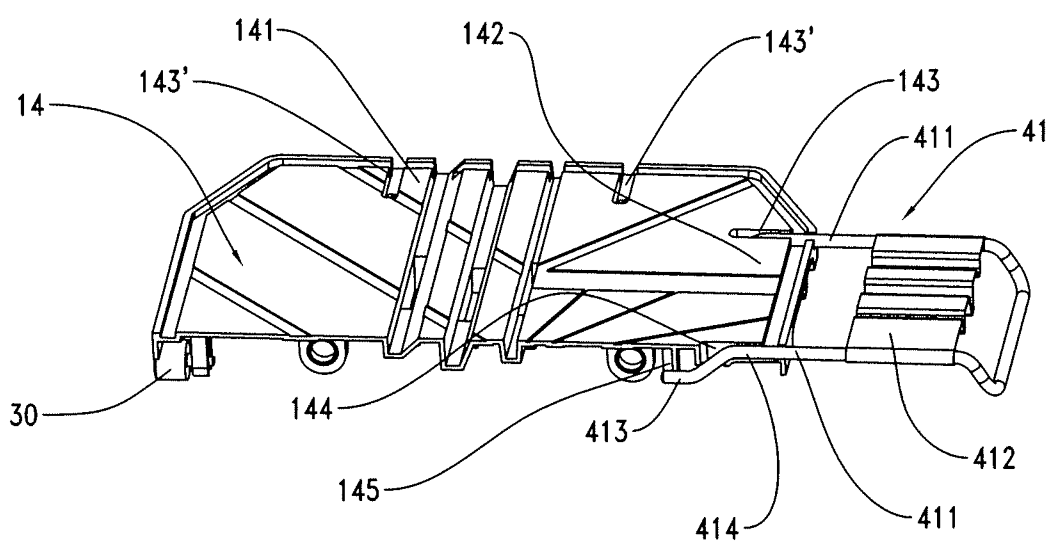
FIG. 3 is an end view of the tile saw in FIG. 2, wherein the secondary table is mounted on the primary table and a portion of the primary table is removed.

FIG. 3 shows an end view of the table 14 with a portion of the table 14 removed. The secondary table 41 is connected to the second edge 142 of the table 14. The secondary table 41 includes supporting legs 411 and supporting plate 412. The table 14 includes slots 143 on the second edge 142 and a hole 144 which runs through the table 14 in the position of the slots 143. The ends of the supporting legs 411 connected to the table 14 include a first portion 413 which is inserted through the hole 144 and extends below the table 14, and a second portion 414 located in the slots 143 and supported by the slots 143. A height difference forms between the first portion 413 and the second portion 414. During usage, the first portions 413 of the supporting legs 411 are inserted into the holes 144 downwardly and extend below the table 14. As a result, the secondary table 41 is secured as an additional supporting surface of the supporting plate 412 and is in substantially the same plane as the supporting surface of the table 14. Meanwhile, the second portions 414 of the supporting legs 411 are located in the slots 143 and contact the inner surface of the slots 143 and the first portions 413 contact the projection 145 on the bottom of the table 14 to provide additional support. Further, the projections 145 on the bottom of the table cooperate with the slots 143 to restrict and fix the supporting legs 411 on the table 14. In order to remove the secondary table 41 from the table 14, the secondary table 41 is pivoted upwardly while the first portions 413 of the supporting legs are taken out from the holes 144. Also, the height difference between first portion 413 and second portion 414 is substantially equal to the length of the projections 145 in the vertical direction, such that the displacement of the first portions 413 of the supporting legs in the vertical direction is limited to ensure the stability of the secondary table 41. This structure for connecting the secondary table 41 to the table 14 allows for quick attachment and detachment of the secondary table without the use of any tools. As a result, users can quickly attach (or detach) the secondary table 41. Similarly, this same connecting structure and method can be easily adopted on the first edge 141 of the table 14. And the slots 143' and the holes (not shown) can be used for mounting the secondary table 41. One of ordinary skill in the art could easily modify the structure of the connection between the secondary table 41 and the table 14 to include other connecting means like magnetism to either strengthen the connection or replace structures of the present invention.

The embodiments disclosed above are only explanatory for the concept and principle of this invention and are not intended to limit the disclosure of the invention. Those skilled in the art will contemplate that this invention will have many other modifications or substitutes which are still falling within the scope of this invention.

What is claimed is:

1. A tile saw, comprising:

a frame;

a primary table moveably supported on the frame having a supporting surface for supporting a work-piece to be cut, wherein the primary table has a first connecting edge and a second connecting edge which is substantially perpendicular to the first connecting edge, the first connecting edge having a first slot on the supporting surface substantially perpendicular to the first connecting edge and the second connecting edge having a second slot on the supporting surface substantially perpendicular to the second connecting edge;

a water tray located under the primary table;

a supporting arm mounted on the frame; and a cutting device supported by the supporting arm;

wherein the tile saw further comprises a secondary table which may be removeably attached to one of the first connecting edge and the second connecting edge without the use of tools, the secondary table having a supporting leg, extending outwardly from the secondary table, and a supporting plate where the supporting leg may be engaged with at least one of the first slot and the second slot when the secondary table is removeably attached to the primary table.

2. A tile saw as claimed in claim 1, wherein the secondary table is attracted to the primary table magnetically.

3. A tile saw as claimed in claim 1, wherein the supporting leg includes a first portion and a second portion which have a height difference therebetween.

4. A tile saw as claimed in claim 3, wherein the primary table includes a projection on its bottom which has a length in the vertical direction that is substantially equal to the height difference.

5. A tile saw as claimed in claim 3, wherein the supporting leg further includes a third portion between the first and second portion, the third portion being positioned at an angle to couple the first and second portion together and to allow for the height difference between the first and second portion.

6. A tile saw as claimed in claim 5, wherein the third portion is connected obliquely between the first and second portion.

* * * * *